April 15, 1924.
C. M. MARTIN
TILLAGE TOOL
Filed Aug. 10, 1922
1,490,222
3 Sheets-Sheet 1
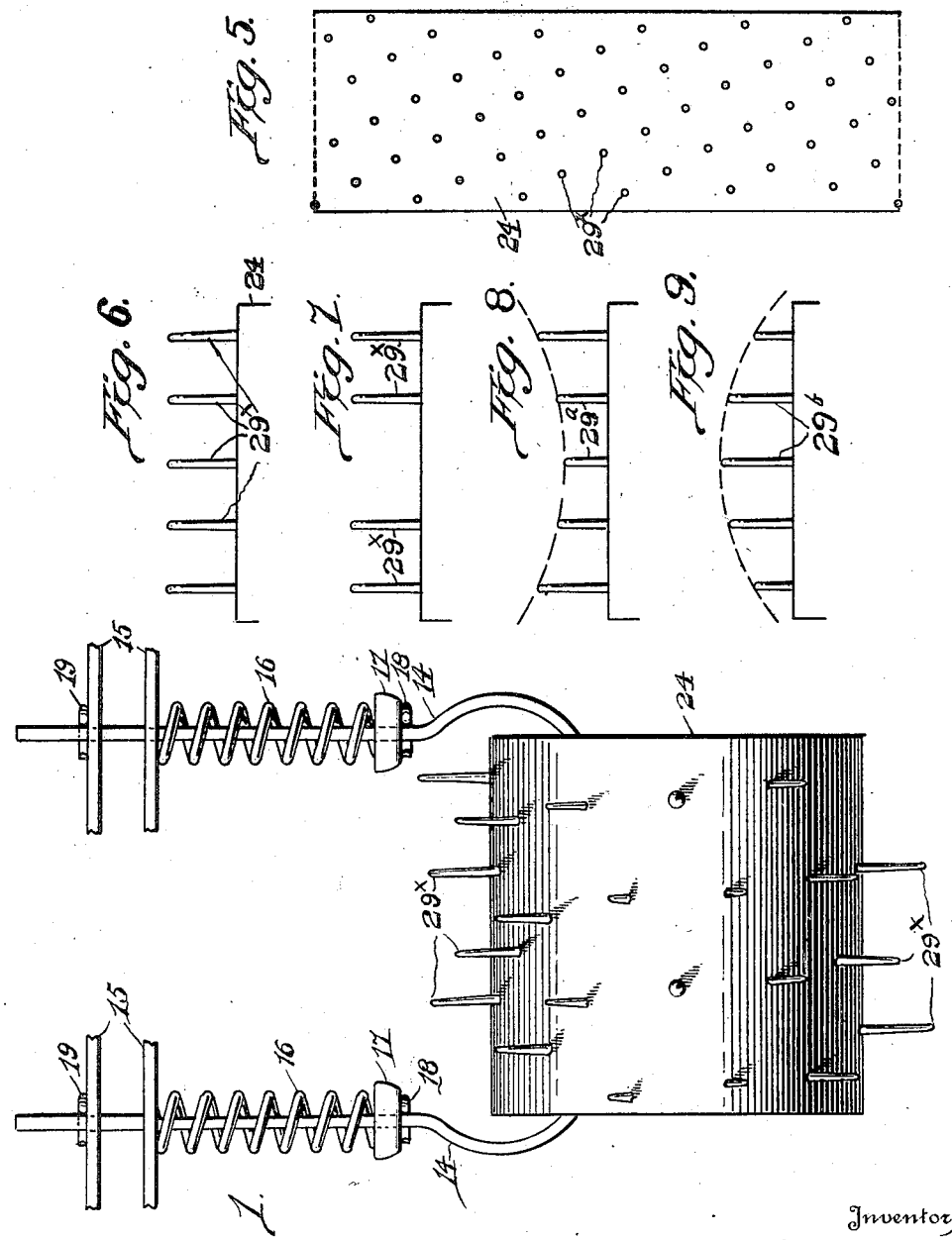

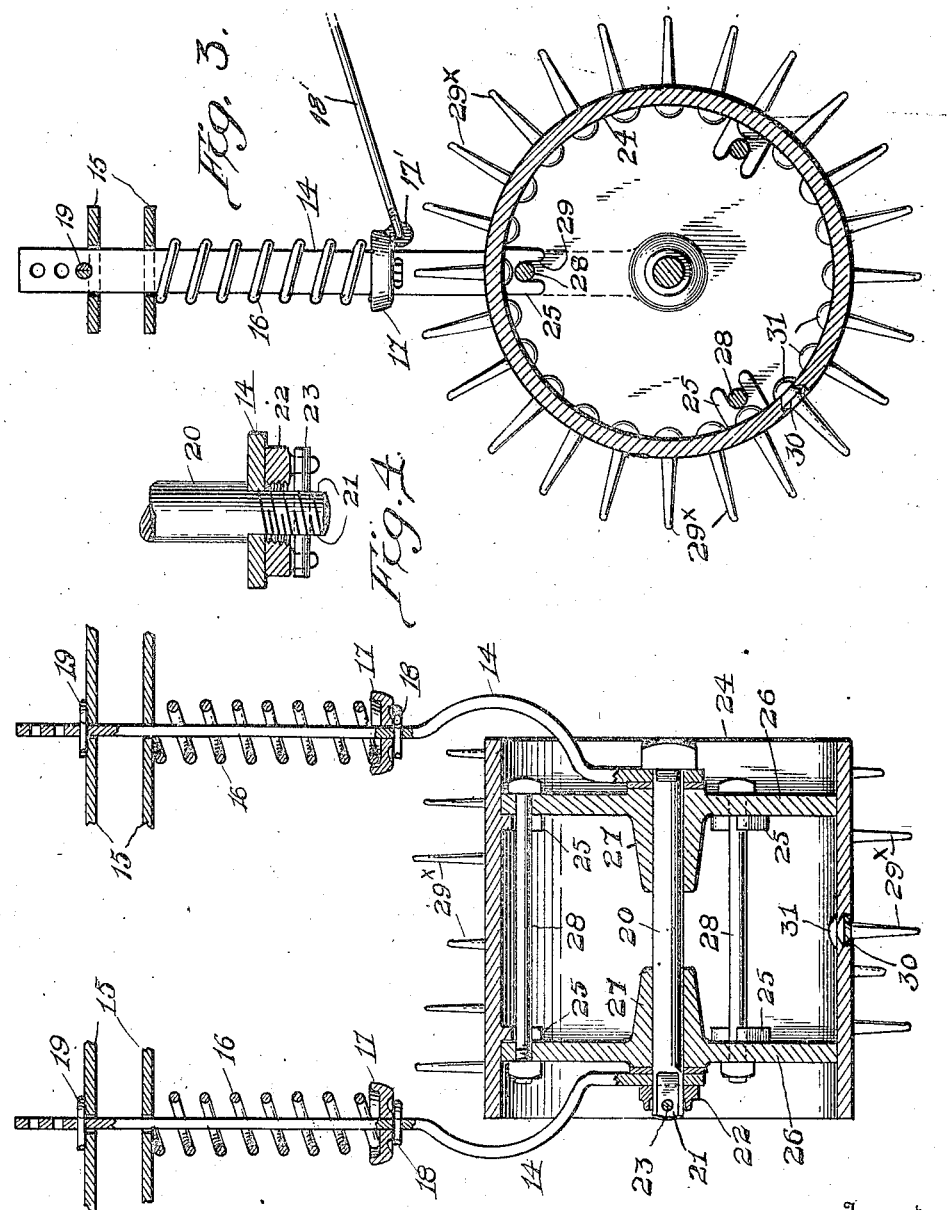

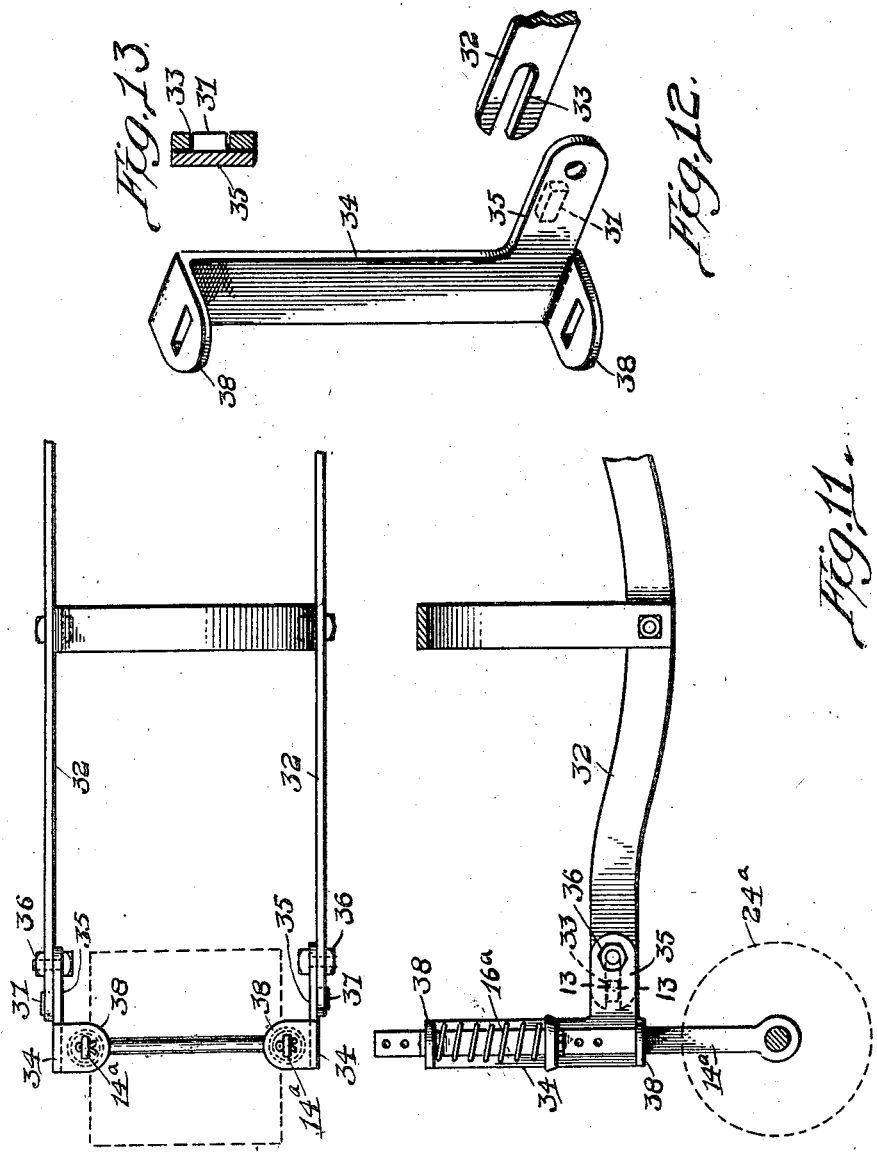

Patented Apr. 15, 1924.

1,490,222

UNITED STATES PATENT OFFICE.

CLIFFORD M. MARTIN, OF WILEY, COLORADO.

TILLAGE TOOL.

Application filed August 10, 1922. Serial No. 580,995.

*To all whom it may concern:*

Be it known that I, CLIFFORD M. MARTIN, a citizen of the United States, residing at Wiley, in the county of Prowers and State of Colorado, have invented certain new and useful Improvements in Tillage Tools, of which the following is a specification.

The present invention relates to devices for breaking the crust and stirring the soil of gardens and the like and the object is to provide a simple structure which may be in the form of an attachment that can be applied to the frame of an agricultural implement, the device being effective for the purpose above set forth.

In the accompanying drawings:—

Figure 1 is a view in elevation of one form of construction.

Figure 2 is a longitudinal sectional view.

Figure 3 is a vertical cross sectional view.

Figure 4 is a detail view illustrating the method of securing the axle.

Figure 5 is a development of the peripheral face of the roller.

Figures 6, 7, 8 and 9 illustrate different arrangements of the roller teeth.

Figure 10 is a plan view of a different form of construction.

Figure 11 is a view in elevation of the same.

Figure 12 is a perspective view of the attachment bracket shown in Figure 11.

Figure 13 is a detail sectional view on the line 13—13 of Figure 11.

In the construction shown in Figures 1 to 6 inclusive, spaced standards 14 are provided that are adapted to be slidably mounted in the frame of an agricultural implement. Portions of such a frame are shown at 15, the standards passing through suitable openings formed in said frame. Said standards 14 are yieldingly held in their lowermost position by coil springs 16 surrounding the same with their upper ends bearing against the lower frame bar 15. The lower ends of the springs 16 rest upon bearing washers 17 suitably mounted as shown at 18 on the standards. The downward movements of the standards are limited by stop pins 19.

The bearing washers 17 have formed integral thereon a lip 17' provided with an opening adapted to receive therein a guy wire or chain 18' which extends forward and connects to the frame of the cultivator adjacent the point where the tool carriage pivots. By this structure, it will be noted that the standards 14 are at all times held perpendicular with respect to the slots in the frame 15, thus permitting the free movement of the standards 14 therein. Without this structure a binding action between 14 and 15 would be present.

The lower ends of the standards 14 are connected by an axle bolt 20 which is preferably held against rotation in the standards by having one end flattened as illustrated at 21 and passing through a correspondingly shaped hole in the standard. A nut 22 threaded on the flattened end is held against accidental displacement by fastening 23.

Rotatably mounted on an axle 20 is a crust-breaking and pulverizing roller. This roller preferably consists of a peripheral wall in the form of a cylinder 24 having internal bifurcated lugs 25. Circular heads 26 are fitted within the ends of the cylinder 24 and have hubs 27 which turn on the axle 20. These heads 26 abut against the lugs 25 and are connected by tie bolts 28 that pass through the notches 29 of said lugs. The cylindrical wall 24 is provided with teeth in the form of tapered spikes 29 which spikes preferably have heads 30 seated in openings formed in a wall 24, the inner ends of said spikes being upset as illustrated at 31.

It will be evident that an implement equipped with this roller, when moved over the ground, will cause the rotation of the roller, and the spikes, sinking into the surface will agitate the same, thereby breaking up any crust and stirring the soil. A yielding pressure is at all times maintained on the roller and the mounting can "give" to the unevenness of the ground. The roller being hollow and the heads readily removable, additional weight can be put therein and removed therefrom whenever desired. The teeth can be arranged in various ways. Thus in Figure 5 is shown a development of the peripheral surface of the frame. It will be noted that said teeth 29 are disposed in staggered relation. They may be of the same length as shown in Figure 6 and equally spaced across the roller, or the intermediate set may be omitted as shown in Figure 7. The teeth may be of different lengths as illustrated at 28$^a$ in Figure 8 the shortest being at the center thereby producing an arrangement that is generally concave. This arrangement may however be reversed and the longest spikes placed in the center as shown at 29$^b$ in Figure 9, producing as shown a convex contour.

In Figures 10 to 13 inclusive a slight modification is shown. In this form of construction the roller is adapted to be applied to the well known form of hand plow and a portion of the frame of said plow is illustrated. It includes longitudinal bars 32 the rear ends of which are notched as illustrated at 33. Brackets are employed comprising vertical bars 34 having forwardly extended ears 35 at their lower ends. These ears are shaped to be fitted as shown at 36 to the rear end of the side bars 32 and are provided with lugs 37 that engage in the notches 33. The vertical bars 34 have their ends offset as shown at 38 and in said ends are suitably mounted standards 14$^a$ corresponding to the standards 14 already described. They are urged downwardly by springs 16$^a$ and carry the roller designated 24$^a$ which is mounted as above described.

From the foregoing, it is thought that the construction, operation and many advantages of the herein described invention will be apparent to those skilled in the art, without further description, and it will be understood that various changes in the sizes, shapes, proportion and minor details of construction may be resorted to without departing from the spirit or sacrificing any of the advantages of the invention.

Having thus fully described my invention, what I claim as new, and desire to secure by Letters Patent, is:—

1. A crust breaker and pulverizer, comprising spaced standards, a roller journaled to and between the standards, springs on the standards, abutments on the standards, against which the springs bear, and draft rods pivoted to the abutments.

2. A crust breaker and pulverizer, comprising an axle and means for connecting the same to an operating frame, and a roller mounted on the axle and comprising a peripheral wall having inset stop lugs, heads fitted within the peripheral wall and abutted against the lugs, and tie bolts connecting the heads and passing through the lugs.

3. A crust breaker and pulverizer, comprising an axle and means for connecting the same to an operating frame, and a roller mounted on the axle and comprising a peripheral wall having inset stop lugs that are bifurcated, forming notches having their inner ends open, heads fitted to the peripheral wall, and tie bolts connecting the heads and passing through the notches.

4. A crust breaker and pulverizer comprising spacer standards having means for attachments to an agricultural implement and having springs for exerting yielding pressure thereagainst, an axle connecting the lower ends of the standards and being held thereby against rotation, and a spiked roller journaled on the axle and comprising a cylindrical wall having internal lugs, heads within the end portions of the cylindrical wall against the lugs, and tie bolts connecting the heads and engaged with the lugs.

In testimony whereof, I affix my signature in the presence of two witnesses.

CLIFFORD M. MARTIN.

Witnesses:
    EDITH M. LAMLE,
    E. R. LAMLE.